US012009548B2

(12) United States Patent
Jiang et al.

(10) Patent No.: US 12,009,548 B2
(45) Date of Patent: Jun. 11, 2024

(54) BATTERY CELL STRUCTURE AND ELECTROCHEMICAL DEVICE

(71) Applicant: NINGDE AMPEREX TECHNOLOGY LIMITED, Ningde (CN)

(72) Inventors: Xingguo Jiang, Ningde (CN); Yan Xu, Ningde (CN); Jiawei Wang, Ningde (CN); Xuchen Lian, Ningde (CN)

(73) Assignee: NINGDE AMPEREX TECHNOLOGY LIMITED, Fujian (CN)

( * ) Notice: Subject to any disclaimer, the term of this patent is extended or adjusted under 35 U.S.C. 154(b) by 59 days.

(21) Appl. No.: 17/362,864

(22) Filed: Jun. 29, 2021

(65) Prior Publication Data

US 2022/0037748 A1 Feb. 3, 2022

(30) Foreign Application Priority Data

Jul. 30, 2020 (CN) .......................... 202010752909.8

(51) Int. Cl.
*H01M 50/538* (2021.01)
*H01M 50/102* (2021.01)
*H01M 50/586* (2021.01)

(52) U.S. Cl.
CPC ....... *H01M 50/538* (2021.01); *H01M 50/102* (2021.01); *H01M 50/586* (2021.01)

(58) Field of Classification Search
CPC ............. H01M 50/538; H01M 50/102; H01M 50/586; H01M 50/533; H01M 50/213;
(Continued)

(56) References Cited

U.S. PATENT DOCUMENTS

| 2007/0037058 A1* | 2/2007 | Visco | ................. | H01M 12/065 |
| | | | | 429/185 |
| 2009/0155683 A1* | 6/2009 | Yoo | ..................... | H01M 50/169 |
| | | | | 429/163 |

(Continued)

FOREIGN PATENT DOCUMENTS

| CN | 106803565 A | 6/2017 |
| CN | 209104298 U | 7/2019 |

(Continued)

OTHER PUBLICATIONS

English Translation of WO 2011035990 A1; Thermal Decoupling of adjacent cells in a battery system (Year: 2011).*
Office Action, CN202010752909.8, dated May 8, 2021, 5 pgs.

*Primary Examiner* — Matthew T Martin
*Assistant Examiner* — Adam J Francis
(74) *Attorney, Agent, or Firm* — Morgan, Lewis & Bockius LLP

(57) ABSTRACT

A battery cell structure includes a first electrode assembly formed by winding a first electrode plate and a second electrode plate, and a second electrode assembly formed by winding a third electrode plate and a fourth electrode plate. The first electrode assembly includes a first lateral surface and a second lateral surface opposite to the first lateral surface. The second electrode assembly includes a third lateral surface disposed opposite to the first lateral surface of the first electrode assembly. The battery cell structure further includes a first tab electrically connected to the third electrode plate and a second tab electrically connected to the fourth electrode plate. Both the first tab and the second tab extend through the first lateral surface and the second lateral surface. The first tab is further electrically connected to the first electrode plate located on the second lateral surface of the first electrode assembly.

15 Claims, 13 Drawing Sheets

(58) Field of Classification Search
CPC ......... H01M 2220/30; H01M 10/0587; H01M 6/10; H01M 6/103; H01M 2006/106; H01M 6/40
See application file for complete search history.

(56) References Cited

U.S. PATENT DOCUMENTS

| | | | |
|---|---|---|---|
| 2013/0196194 A1* | 8/2013 | Park | H01M 50/105 |
| | | | 429/72 |
| 2016/0099454 A1* | 4/2016 | Kwon | H01M 50/557 |
| | | | 429/159 |
| 2016/0099456 A1* | 4/2016 | Kwon | H01M 6/46 |
| | | | 429/94 |
| 2016/0329546 A1 | 11/2016 | Ham et al. | |
| 2017/0092923 A1 | 3/2017 | Pasma et al. | |
| 2018/0130985 A1* | 5/2018 | Kim | H01M 50/116 |
| 2019/0006698 A1* | 1/2019 | Kawai | H01M 10/0431 |
| 2019/0280282 A1* | 9/2019 | Han | H01M 50/50 |
| 2020/0313223 A1* | 10/2020 | Roy | H01M 50/531 |
| 2020/0373545 A1* | 11/2020 | Quan | H01M 10/0587 |

FOREIGN PATENT DOCUMENTS

| | | | | |
|---|---|---|---|---|
| CN | 111211357 A | | 5/2020 | |
| EP | 2450990 A2 | * | 5/2012 | .......... H01M 2/1077 |
| WO | WO-2011035990 A1 | * | 3/2011 | .......... H01M 10/613 |

\* cited by examiner

BATTERY CELL STRUCTURE AND ELECTROCHEMICAL DEVICE

CROSS-REFERENCE TO RELATED APPLICATIONS

This application is based upon and claims priority to Chinese Application No. 202010752909.8, filed on Jul. 30, 2020 and entitled "BATTERY CELL STRUCTURE AND ELECTROCHEMICAL DEVICE", which is incorporated herein by reference in its entirety.

TECHNICAL FIELD

This application relates to the technical field of electrochemical devices, and in particular, to a battery cell structure and an electrochemical device.

BACKGROUND

With the rapid development of electronic products, higher requirements are imposed on power consumption and endurance of the products. In a design process of an electronic product, a space left for accommodating a battery may be an irregular shape such as "L" shaped and "T" shaped other than a cuboid after electronic elements are laid out. Therefore, a battery manufacturer needs to develop a special-shaped battery that fits the accommodation space to improve space utilization of the electronic device.

Currently, a special-shaped battery is generally manufactured by using a stacking technique in the industry. However, the stacking technique is inefficient in production and material utilization, thereby resulting in high production costs. In addition, based on the currently available stacking technique, a special-shaped electrode plate cannot be manufactured by directly coating the electrode plate, but a rectangular electrode plate needs to be coated first before a desired special-shaped electrode plate is cut out. The electrode plate materials cut away have to be scrapped, thereby leading to a low utilization rate of the materials.

SUMMARY

In view of the foregoing situation, it is necessary to provide an electrochemical device and a battery cell structure. The battery cell structure forms a special-shaped battery cell by using two jelly-roll type electrode assemblies, so that production efficiency of the battery cell is high and a utilization rate of electrode plate materials is high.

An embodiment of this application provides a battery cell structure, including a first electrode assembly formed by winding a first electrode plate and a second electrode plate, and a second electrode assembly formed by winding a third electrode plate and a fourth electrode plate. The first electrode assembly includes a first lateral surface and a second lateral surface opposite to the first lateral surface. The second electrode assembly includes a third lateral surface disposed opposite to the first lateral surface of the first electrode assembly. The battery cell structure further includes a first tab electrically connected to the third electrode plate and a second tab electrically connected to the fourth electrode plate. Both the first tab and the second tab extend through the first lateral surface and the second lateral surface of the first electrode assembly. The first tab is further electrically connected to the first electrode plate located on the second lateral surface of the first electrode assembly.

In some embodiments, the second tab is further electrically connected to the second electrode plate located on the second lateral surface of the first electrode assembly.

In some embodiments, the battery cell structure further includes a third tab and a fourth tab. The first electrode plate is electrically connected to the first tab through the third tab, and the second electrode plate is electrically connected to the second tab through the fourth tab.

In some embodiments, the first electrode assembly includes n winding layers. An innermost winding layer of the first electrode assembly is defined as a 1st winding layer of the first electrode assembly. An outermost winding layer of the first electrode assembly is defined as an nth winding layer of the first electrode assembly. The second electrode assembly includes m winding layers. An innermost winding layer of the second electrode assembly is defined as a 1st winding layer of the second electrode assembly. An outermost winding layer of the second electrode assembly is defined as an mth winding layer of the second electrode assembly, where both n and m are positive integers greater than 1.

In some embodiments, the first tab is electrically connected to the first electrode plate on the nth winding layer of the first electrode assembly, and the second tab is electrically connected to the second electrode plate on the nth winding layer of the first electrode assembly.

In some embodiments, a first insulation layer is disposed between the first tab located in the first electrode assembly and the nth winding layer of the first electrode assembly. A second insulation layer is disposed between the first tab located in the first electrode assembly and the second tab located in the first electrode assembly.

In some embodiments, the first tab is electrically connected to the third electrode plate on the 1st winding layer of the second electrode assembly, and the second tab is electrically connected to the fourth electrode plate on the 1st winding layer of the second electrode assembly.

In some embodiments, the first tab is electrically connected to the third electrode plate on the mth winding layer of the second electrode assembly, and the second tab is electrically connected to the fourth electrode plate on the mth winding layer of the second electrode assembly.

In some embodiments, the first tab is electrically connected to the third electrode plate on an ith winding layer of the second electrode assembly, and the second tab is electrically connected to the fourth electrode plate on a jth winding layer of the second electrode assembly, where both i and j are positive integers greater than 1 and less than m.

In some embodiments, the battery cell structure further includes an insulation layer disposed between the first electrode assembly and the second electrode assembly.

In some embodiments, the insulation layer is disposed on the first lateral surface of the first electrode assembly, or disposed on the third lateral surface of the second electrode assembly.

In some embodiments, the insulation layer is disposed on both the first lateral surface of the first electrode assembly and the third lateral surface of the second electrode assembly.

In some embodiments, a length of a tab extending out of the second electrode assembly is equal to a length of the first electrode assembly plus a preset length, and the preset length is less than or equal to 10 mm.

In some embodiments, the first electrode assembly and the second electrode assembly share a housing, and, when a main plane of the second electrode assembly is used as a line-of-sight plane, the first electrode assembly and the second electrode assembly form an L-shaped electrode assembly shape or a T-shaped electrode assembly shape.

In some embodiments, the first electrode plate and the second electrode plate are wound around a first reel to form the first electrode assembly, the third electrode plate and the fourth electrode plate are wound around a second reel to form the second electrode assembly, and the first reel is parallel or perpendicular to the second reel.

In some embodiments, the first tab is formed by cutting a current collector of the third electrode plate, and the second tab is formed by cutting a current collector of the fourth electrode plate.

In the battery cell structure according to the embodiments of this application, a tab extends out of a lateral surface of the second electrode assembly, and the tab sequentially runs through the first lateral surface and the second lateral surface of the first electrode assembly, and, on the second lateral surface, connects the first electrode assembly to form a special-shaped battery cell, thereby improving production efficiency of the battery cell and a utilization rate of electrode plate materials.

An embodiment of this application further provides an electrochemical device. The electrochemical device includes a battery cell structure. The battery cell structure includes a first electrode assembly formed by winding a first electrode plate and a second electrode plate, and a second electrode assembly formed by winding a third electrode plate and a fourth electrode plate. The first electrode assembly includes a first lateral surface and a second lateral surface opposite to the first lateral surface. The second electrode assembly includes a third lateral surface disposed opposite to the first lateral surface of the first electrode assembly. The battery cell structure further includes a first tab electrically connected to the third electrode plate and a second tab electrically connected to the fourth electrode plate. Both the first tab and the second tab extend through the first lateral surface and the second lateral surface of the first electrode assembly. The first tab is further electrically connected to the first electrode plate located on the second lateral surface of the first electrode assembly.

In the electrochemical device according to the embodiments of this application, a tab extends out of a lateral surface of the second electrode assembly, and the tab sequentially runs through the first lateral surface and the second lateral surface of the first electrode assembly, and, on the second lateral surface, connects the first electrode assembly to form a special-shaped battery cell, thereby improving production efficiency of the battery cell and a utilization rate of electrode plate materials.

REFERENCE NUMERALS

Figure 1:
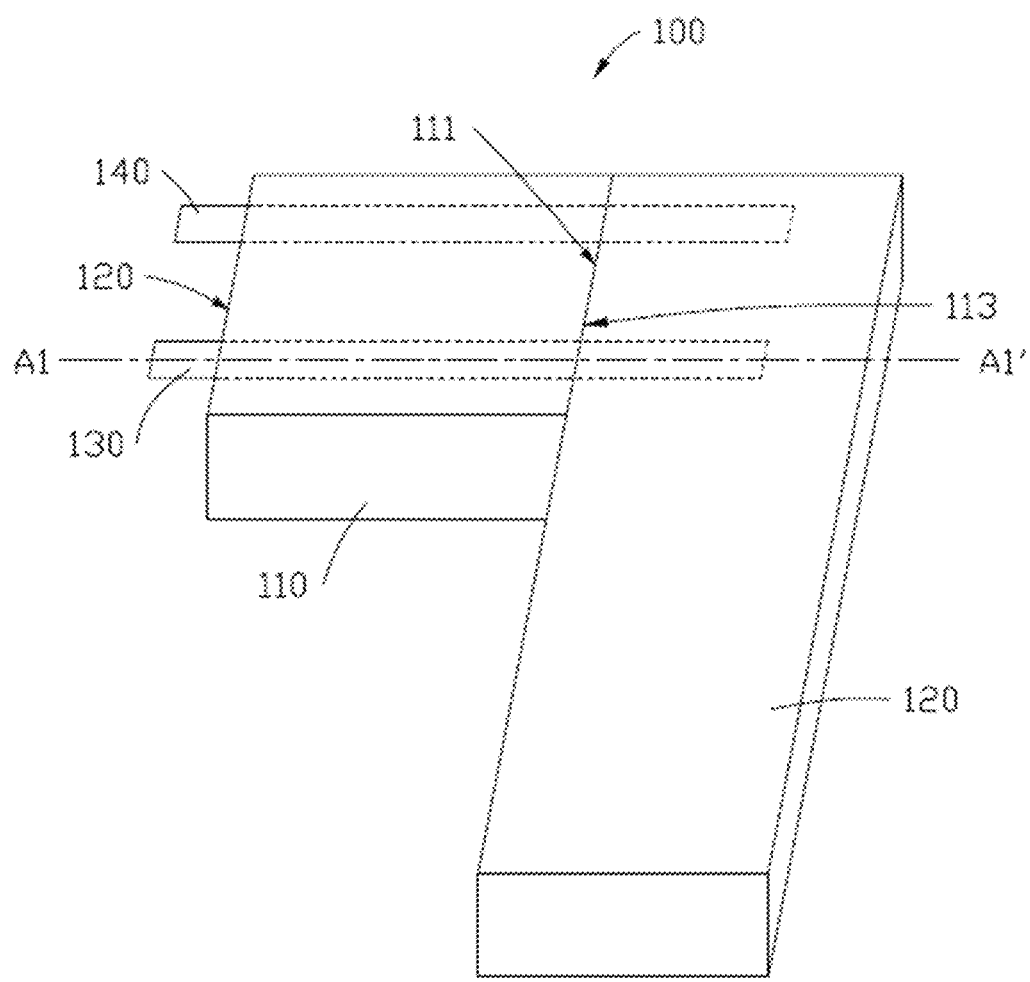
FIG. 1 is a schematic structural diagram of a battery cell structure according to an embodiment of this application.

First electrode plate 11, first separator 12, second electrode plate 13, second separator 14, third electrode plate 21, third separator 22, fourth electrode plate 23, fourth separator 24, battery cell structure 100, first electrode assembly 110, first lateral surface 111, second lateral surface 112, third lateral surface 113, second electrode assembly 120, first tab 130, second tab 140, insulation layer 150, first bent section 130a, first tab section 130b, second tab section 130c, housing 200, electrochemical device 300.

DETAILED DESCRIPTION OF EMBODIMENTS

The following describes embodiments of this application in detail. Examples of the embodiments are shown in the drawings, in which always identical or similar reference numerals indicate identical or similar components or the components that serve identical or similar functions. The embodiments described below with reference to the drawings are exemplary, and are merely intended to construe this application but not intended to limit this application.

The following describes a battery cell structure 100 in detail according to embodiments of this application with reference to FIG. 1 to FIG. 11.

Figure 2:
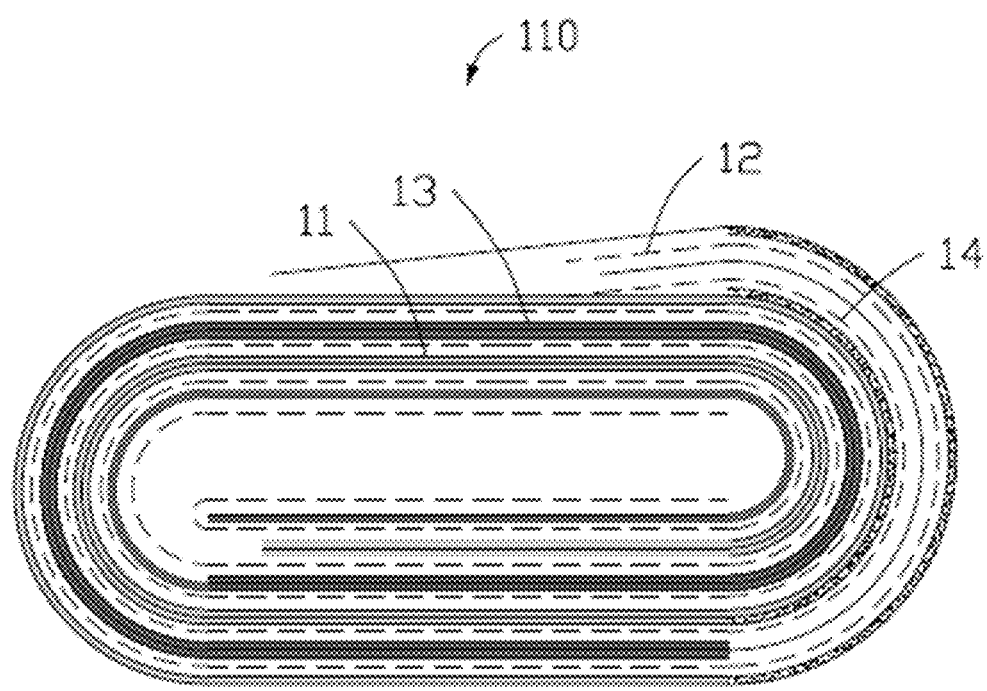
FIG. 2 is a schematic structural diagram of a first electrode assembly according to an embodiment of this application.
Figure 3:
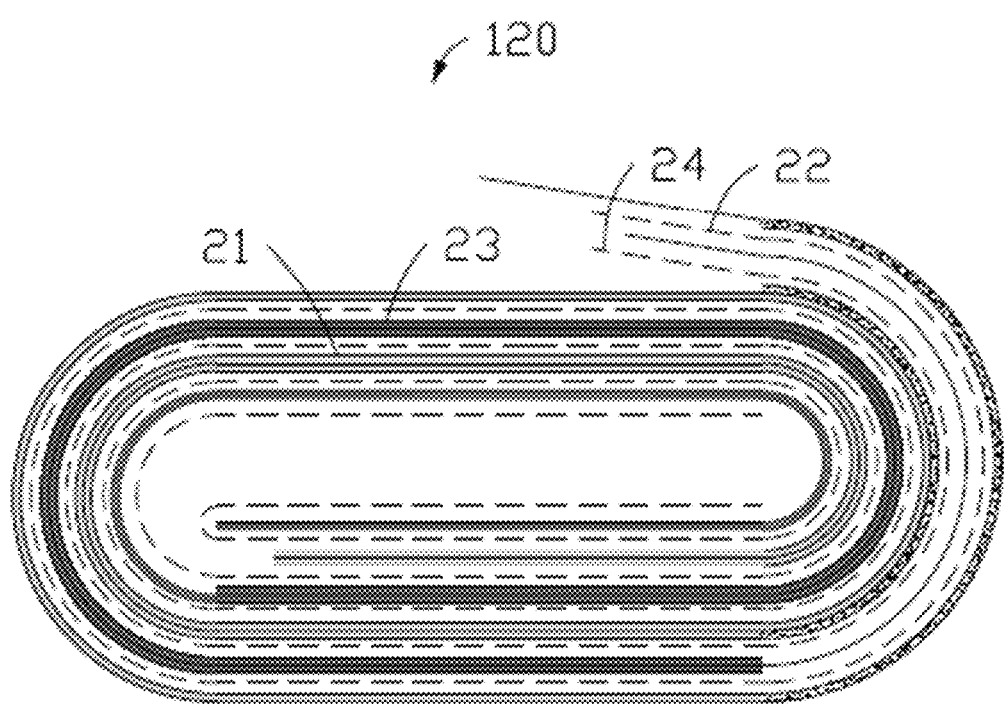
FIG. 3 is a schematic structural diagram of a second electrode assembly according to an embodiment of this application.

As shown in FIG. 1 to FIG. 3, the battery cell structure 100 according to an embodiment of this application includes a first electrode assembly 110, a second electrode assembly 120, a first tab 130, and a second tab 140. The first electrode assembly 110 is formed by winding a first electrode plate 11, a first separator 12, a second electrode plate 13, and a second separator 14 around a first reel. The second electrode assembly 120 is formed by winding a third electrode plate 21, a third separator 22, a fourth electrode plate 23, and a fourth separator 24 around a second reel. The first tab 130 is electrically connected to the third electrode plate 21, and the second tab 140 is electrically connected to the fourth electrode plate 23. The first electrode assembly 110 includes a first lateral surface 111 and a second lateral surface 112 opposite to the first lateral surface 111. The second electrode assembly 120 includes a third lateral surface 113. The third lateral surface 113 of the second electrode assembly 120 is disposed opposite to the first lateral surface 111 of the first electrode assembly 110. The first tab 130 and the second tab 140 extend out of the third lateral surface 113 of the second electrode assembly 120, and extend through the first lateral surface 111 and the second lateral surface 112 of the first electrode assembly 110. The first tab 130 is further electrically connected to the first electrode plate 11 located on the second lateral surface 112 of the first electrode assembly 110. In other embodiments, the first electrode assembly 110 may also be formed by winding the first electrode plate 11, the first separator 12, and the second electrode plate 13 around the first reel. The second electrode assembly 120 may also be formed by winding the third electrode plate 21, the third separator 22, and the fourth electrode plate 23 around the second reel.

In some embodiments, the second tab 140 is further electrically connected to the second electrode plate 12 located on the second lateral surface 112 of the first electrode assembly 110.

In some embodiments, the battery cell structure 100 may further include a third tab and a fourth tab. The first electrode plate 11 may be electrically connected to the first tab 130 through the third tab indirectly, and the second electrode plate 12 may be electrically connected to the second tab 140 through the fourth tab indirectly. The third tab may be formed by directly cutting a current collector of the first electrode plate 11, and the fourth tab may be formed by directly cutting a current collector of the second electrode plate 13.

In some embodiments, the first reel may be parallel or perpendicular to the second reel.

In some embodiments, the first tab 130 may be electrically connected to an empty foil region of the first electrode plate 11 and an empty foil region of the third electrode plate 21. The second tab 140 may be electrically connected to an empty foil region of the second electrode plate 13 and an empty foil region of the fourth electrode plate 23. In other embodiments, the first electrode plate 11, the second electrode plate 13, the third electrode plate 21, and the fourth electrode plate 23 may further include a connection region exposed by a cleaning treatment. The first tab 130 may also be electrically connected to the connection region of the first electrode plate 11 or the connection region of the third electrode plate 21. The second tab 140 may also be electrically connected to the connection region of the second electrode plate 13 or the connection region of the fourth electrode plate 23.

In some embodiments, the first tab 130 is a positive tab and the second tab 140 is a negative tab, or, the first tab 130 is a negative tab and the second tab 140 is a positive tab. When the first tab 130 is a positive tab and the second tab 140 is a negative tab, the first electrode plate 11 and the third electrode plate 21 may be aluminum foils coated with a positive active layer, and the second electrode plate 13 and the fourth electrode plate 23 may be copper foils coated with a negative active layer. When the first tab 130 is a negative tab and the second tab 140 is a positive tab, the first electrode plate 11 and the third electrode plate 21 may be copper foils coated with a negative active layer, and the second electrode plate 13 and the fourth electrode plate 23 may be aluminum foils coated with a positive active layer.

In some embodiments, the first tab 130 is electrically connected to the first electrode plate 11 and the third electrode plate 21 by welding (welding onto the empty foil region or connection region of the electrode plate), or by other connection means (for example, by adhesion with conductive adhesive tape). The first tab 130 may also be formed by directly cutting the current collector of the third electrode plate 21. Similarly, the second tab 140 may be electrically connected to the second electrode plate 13 and the fourth electrode plate 23 by welding or by other connection means. The second tab 140 may also be formed by directly cutting the current collector of the fourth electrode plate 23.

In the battery cell structure 100 according to the embodiment of this application, a tab extends out of a lateral surface of the second electrode assembly 120, and the tab sequentially runs through the first lateral surface and the second lateral surface of the first electrode assembly 110, and, on the second lateral surface, connects the first electrode assembly 110 to form a special-shaped battery cell, thereby improving production efficiency of the battery cell and a utilization rate of electrode plate materials.

As shown in FIG. 2, the first electrode assembly 110 includes n winding layers. An innermost winding layer of the first electrode assembly 110 is defined as a $1^{st}$ winding layer of the first electrode assembly 110. An outermost winding layer of the first electrode assembly 110 is defined as an $n^{th}$ winding layer of the first electrode assembly 110, where n is a positive integer greater than 1. For example, n is 10, indicating that the first electrode assembly 110 includes 10 winding layers.

As shown in FIG. 3, the second electrode assembly 120 includes m winding layers. An innermost winding layer of the second electrode assembly 120 is defined as a $1^{st}$ winding layer of the second electrode assembly 120. An outermost winding layer of the second electrode assembly 120 is defined as an $m^{th}$ winding layer of the second electrode assembly 120, where m is a positive integer greater than 1. For example, m is 9, indicating that the second electrode assembly 120 includes 9 winding layers.

In some embodiments, the first tab 130 extending out of the third lateral surface 113 of the second electrode assembly 120 is electrically connected to the first electrode plate 11 on the $n^{th}$ winding layer of the first electrode assembly 110, and the second tab 140 extending out of the third lateral surface 113 of the second electrode assembly 120 is electrically connected to the second electrode plate 13 on the $n^{th}$ winding layer of the first electrode assembly 110.

In some embodiments, for ease of connecting the first tab 130 and the second tab 140 to the first electrode plate 11 and the second electrode plate 13 respectively, an extension length of the first electrode plate 21 on the $n^{th}$ winding layer of the first electrode assembly 110 is preferably greater than an extension length of the second electrode plate 13.

Figure 4:
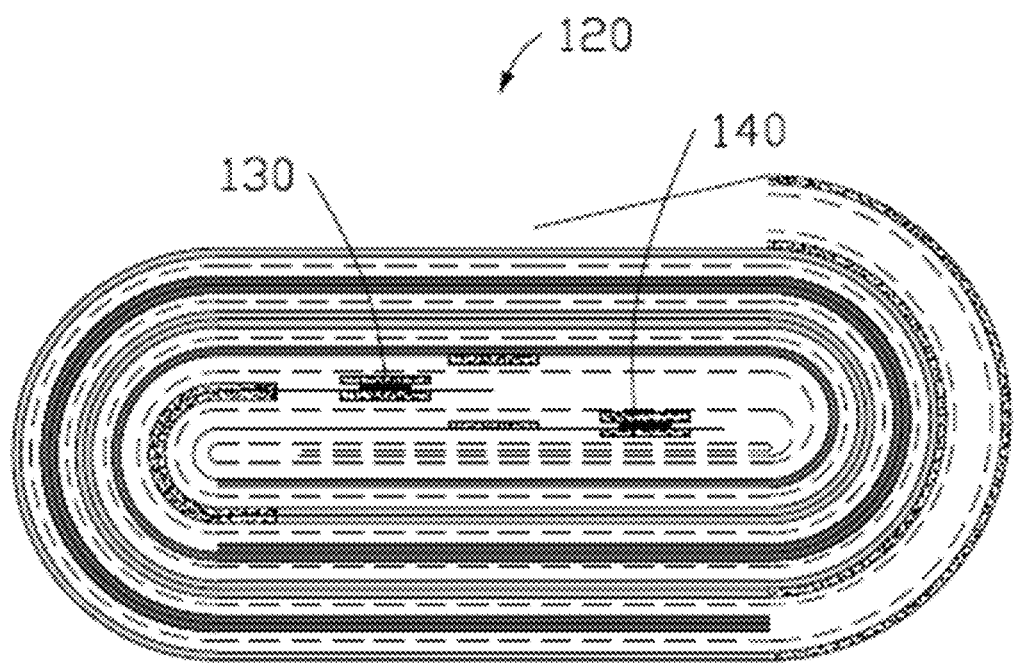
FIG. 4 is a schematic diagram of a connection position at which a first tab and a second tab are electrically connected to a second electrode assembly according to an embodiment of this application.
Figure 5:
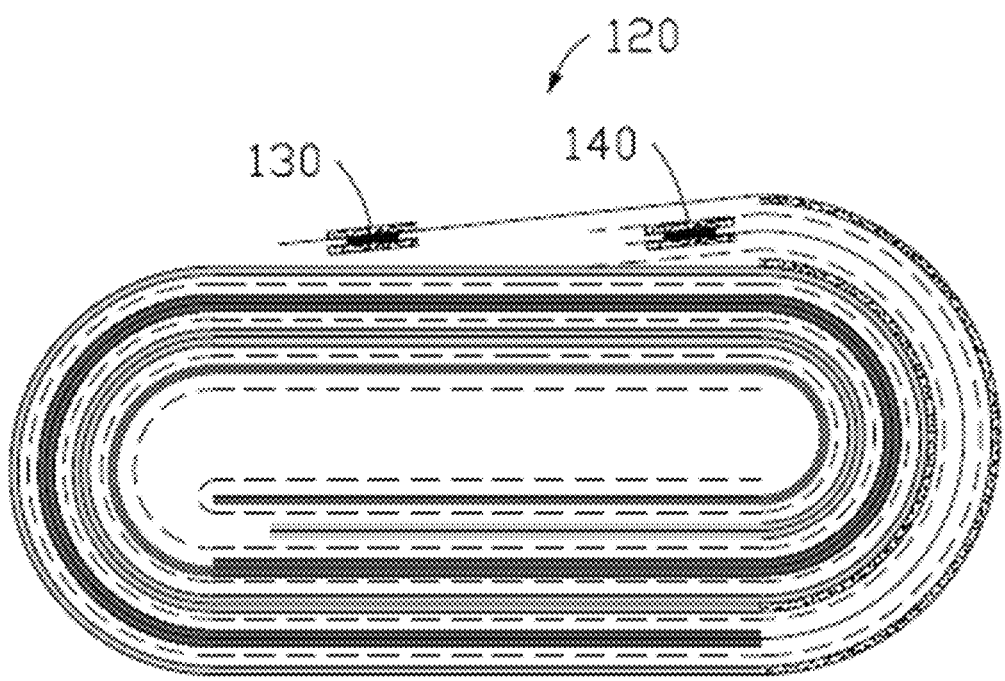
FIG. 5 is a schematic diagram of a connection position at which a first tab and a second tab are electrically connected to a second electrode assembly according to another embodiment of this application.
Figure 6:
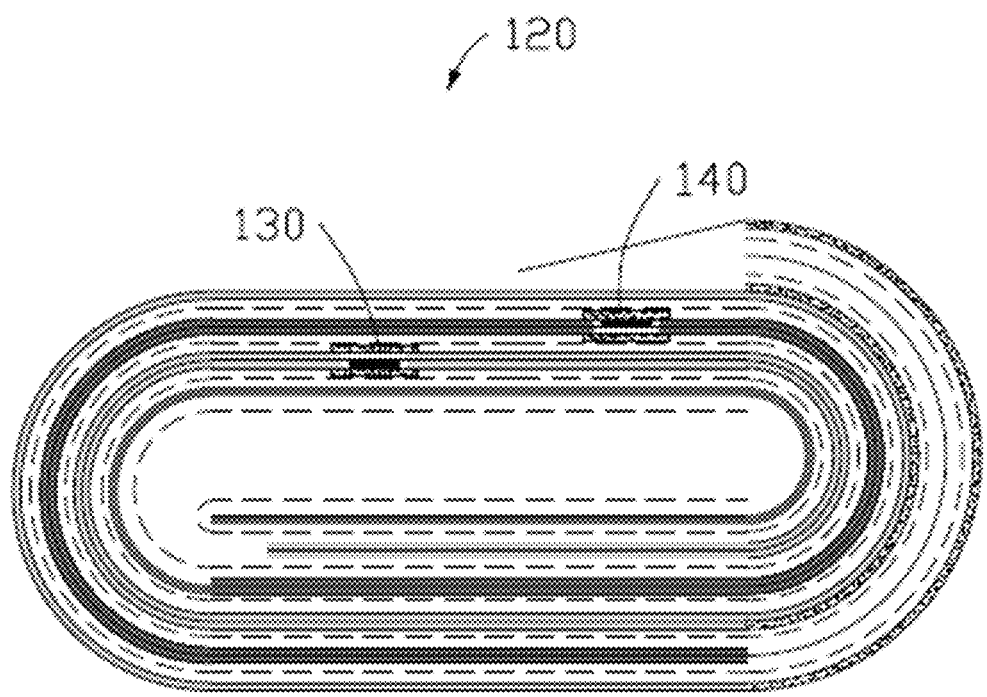
FIG. 6 is a schematic diagram of a connection position at which a first tab and a second tab are electrically connected to a second electrode assembly according to still another embodiment of this application.

In some embodiments, for the second electrode assembly 120, the first tab 130 and the second tab 140 may be electrically connected to the electrode plate on the innermost winding layer, or an electrode plate on a middle winding layer, or the electrode plate on the outermost winding layer, or any combination thereof. For example, the first tab 130 is electrically connected to the electrode plate on the innermost winding layer, and the second tab 140 is electrically connected to an electrode plate on a middle winding layer. As shown in FIG. 4, the first tab 130 is electrically connected to the third electrode plate 21 on the $1^{st}$ winding layer of the second electrode assembly 120, and the second tab 140 is electrically connected to the fourth electrode plate 23 on the $1^{st}$ winding layer of the second electrode assembly 120. As shown in FIG. 5, the first tab 130 is electrically connected to the third electrode plate 21 on the $m^{th}$ winding layer of the second electrode assembly 120, and the second tab 140 is electrically connected to the fourth electrode plate 23 on the $m^{th}$ winding layer of the second electrode assembly 120. As shown in FIG. 6, the first tab 130 is electrically connected to the third electrode plate 21 on an $i^{th}$ winding layer of the second electrode assembly 120, and the second tab 140 is electrically connected to the fourth electrode plate 23 on the $j^{th}$ winding layer of the second electrode assembly 120, where both i and j are positive integers greater than 1 and less than n.

In some embodiments, a difference between i and j is preferably greater than or equal to a preset value. The preset value may be set according to actual needs. For example, the preset value is 4, indicating that when the first tab 130 and the second tab 140 are electrically connected to electrode plates on middle winding layers, the winding layer to which the first tab 130 is electrically connected and the winding layer to which the second tab 140 is electrically connected are spaced out from each other 4 or more layers apart.

Figure 7A:
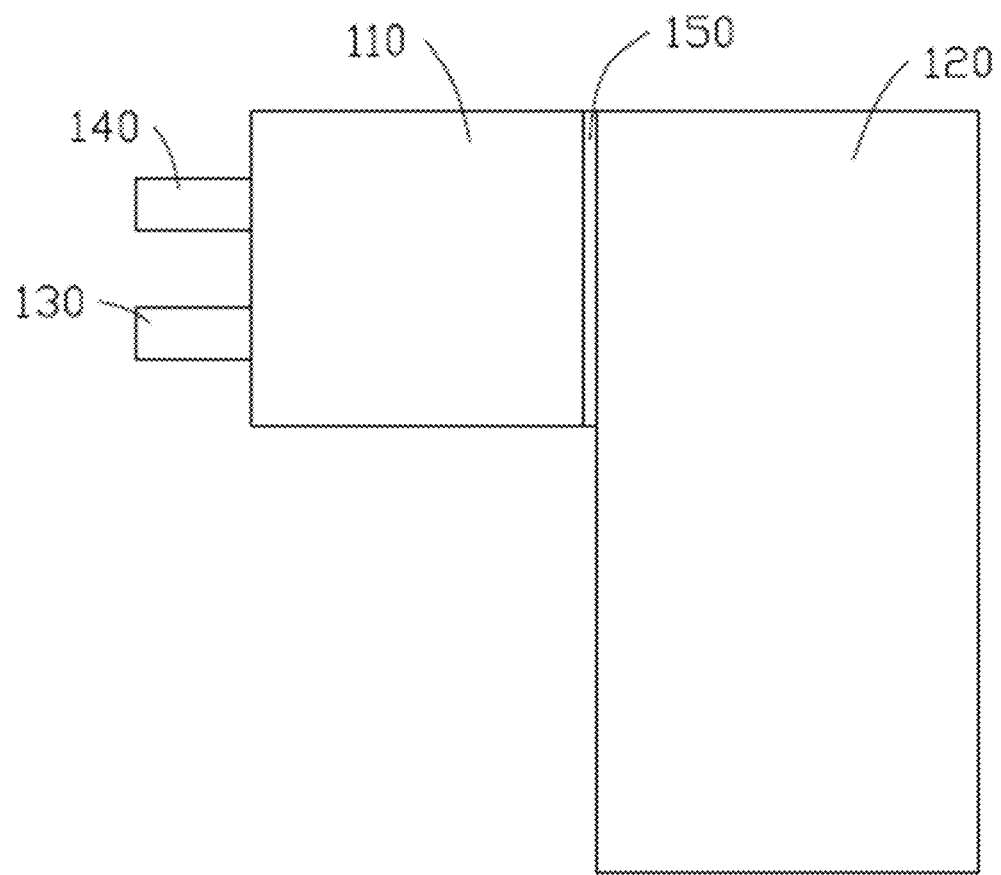
FIG. 7A and FIG. 7B are schematic diagrams of a manner of disposing an insulation layer according to an embodiment of this application.
Figure 7B:
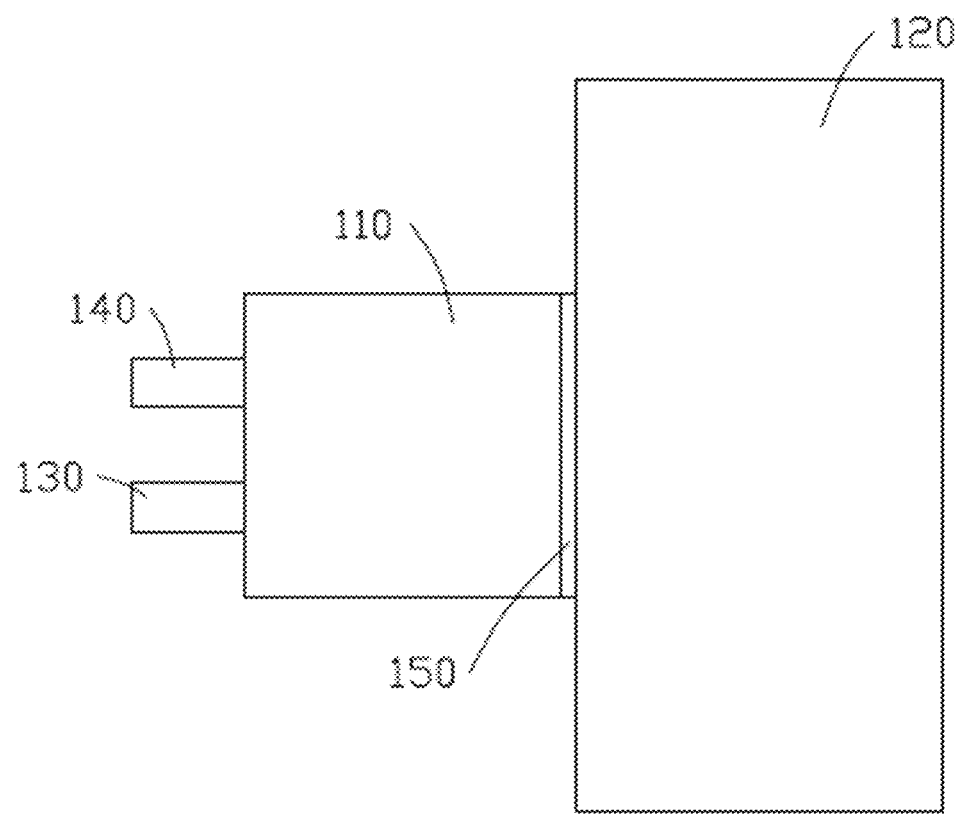

As shown in FIG. 7A and FIG. 7B, in order to avoid contact and a short circuit between the first electrode assembly 110 and the second electrode assembly 120, an insulation layer 150 is disposed between the first lateral surface 111 of the first electrode assembly 110 and the third lateral surface 113 of the second electrode assembly 120. The insulation layer 150 may be disposed on the first lateral surface 111 of the first electrode assembly 110 or on the third lateral surface 113 of the second electrode assembly 120. In other embodiments, the insulation layer 150 may be disposed on both the first lateral surface 111 of the first electrode assembly 110 and the third lateral surface 113 of the second electrode assembly 120.

In some embodiments, the insulation layer 150 may be insulation tape or an insulation adhesive line formed by coagulation of adhesive droplets. A surface of the insulation tape is sticky, and can adhere to the first lateral surface 111 of the first electrode assembly 110 or the third lateral surface 113 of the second electrode assembly 120 to isolate the first electrode assembly 110 from the second electrode assembly 120. The insulation tape is preferably adhesive on a single side. A material of the insulation tape may be polyethylene (PE). A width and a quantity of the insulation tape may be determined based on a sticking process of the insulation tape and isolation requirements of the electrode assembly. The insulation layer 150 preferably avoids the first tab 130 and the second tab 140.

Understandably, the insulation layer 150 may also be made of other non-conductive materials.

Figure 8:
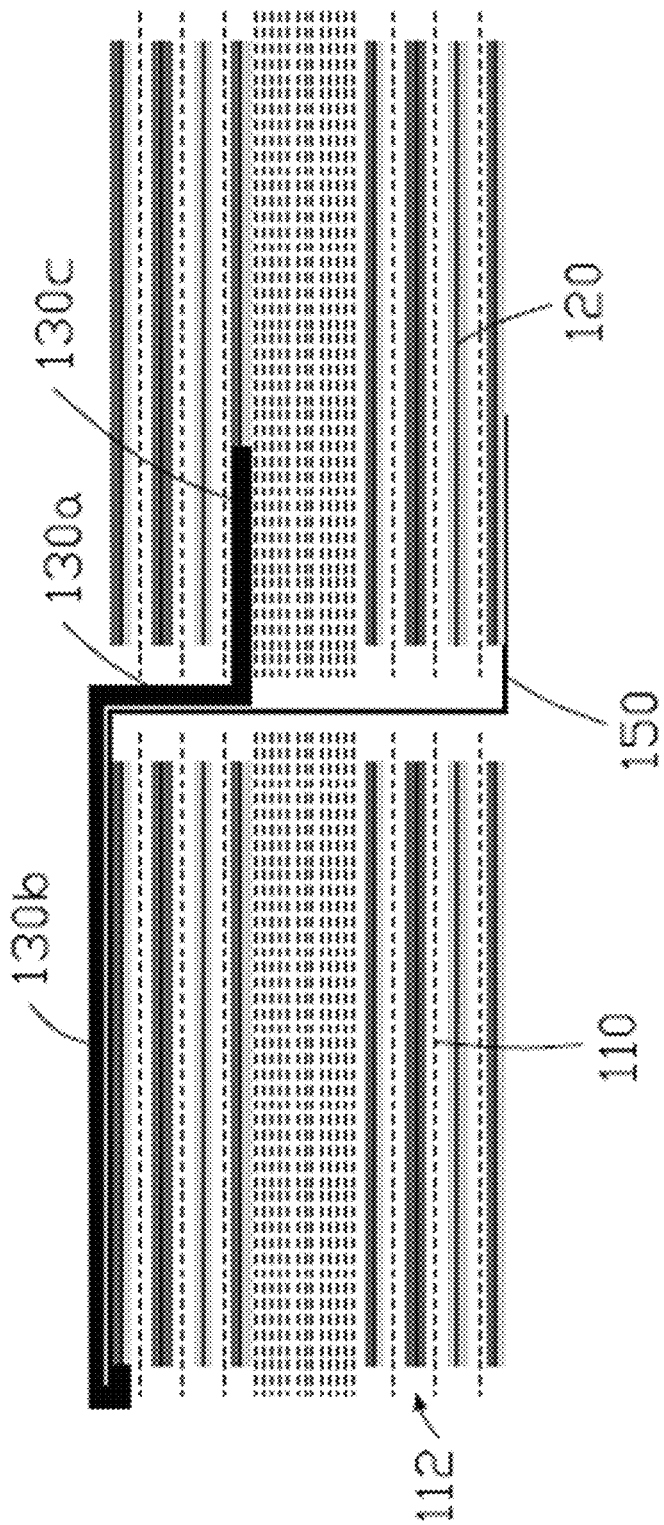
FIG. 8 is a cross-sectional view along an A1-A1' section line of a first electrode assembly and a second electrode assembly laid out in a horizontal winding direction according to an embodiment of this application.

As shown in FIG. 8 (a cross-sectional view taken along an A1-A1' section line shown FIG. 1), the first electrode assembly 110 and the second electrode assembly 120 are laid out in a horizontal winding direction. The first tab 130 is electrically connected to the third electrode plate 21 on a middle winding layer of the second electrode assembly 120 or the third electrode plate 21 on the innermost winding layer. In this case, the first tab 130 extending out of the third lateral surface 113 of the second electrode assembly 120 may be bent to a position above the first electrode assembly 110 first, and then extended to the second lateral surface 112 of the first electrode assembly 110 and electrically connected to the first electrode plate 11 located on the second lateral surface 112. The first tab 130 includes a first bent section 130a, a first tab section 130b, and a second tab section 130c. The first bent section 130a is located between the first tab section 130b and the second tab section 130c. The first tab section 130b is located inside the first electrode assembly 110. The second tab section 130c is located inside the second electrode assembly 120. The first bent section 130a is located between the first electrode assembly 110 and the second electrode assembly 120.

In some embodiments, a length of the first tab 130 extending out of the third lateral surface 113 of the second electrode assembly 120 is equal to a length of the first electrode assembly 110 plus a first preset length. A welding overlap is generated between the first tab 130 and the electrode plate of the first electrode assembly 110 during welding, the first bent section 130a exists, and a length of the tab needs to be reserved as a buffer section. Therefore, optionally, the preset length is less than or equal to 10 mm.

Understandably, optionally, a length of the second tab 140 extending out of the third lateral surface 113 of the second electrode assembly 120 is equal to the length of the first electrode assembly 110 plus the first preset length.

In some embodiments, to prevent the first tab 130 and the second tab 140 from being short-circuited while bending and extending to the second lateral surface 112 of the first electrode assembly 110, single-sided insulation tape may be affixed to inner and outer sides of the first tab 130 as well as inner and outer sides of the second tab 140. The insulation tape can also serve to fix the tab.

Figure 9:
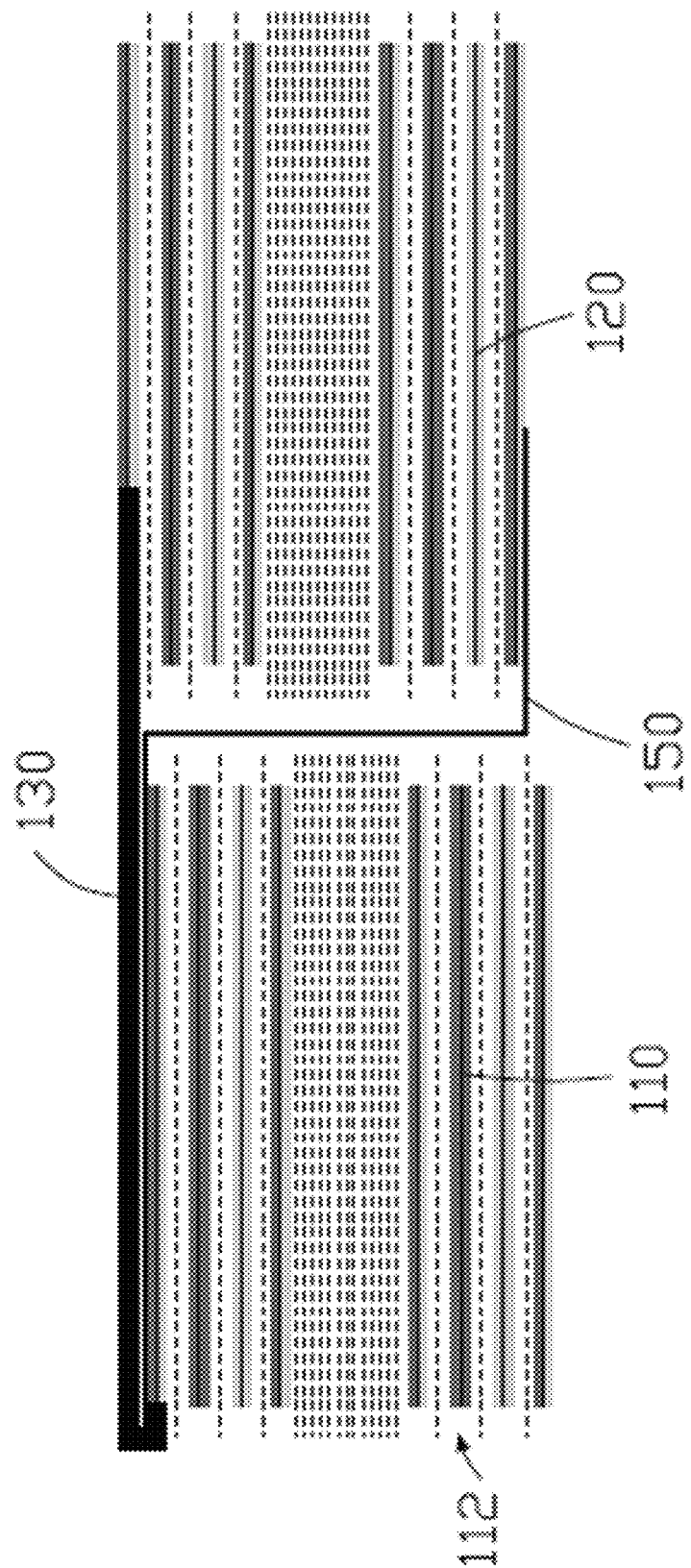
FIG. 9 is a cross-sectional view along an A1-A1' section line of a first electrode assembly and a second electrode assembly laid out in a horizontal winding direction according to another embodiment of this application.

As shown in FIG. 9 (a cross-sectional view taken along the A1-A1' section line shown FIG. 1), the first electrode assembly 110 and the second electrode assembly 120 are laid out in a horizontal winding direction. The first tab 130 is electrically connected to the third electrode plate 21 on the $m^{th}$ winding layer of the second electrode assembly 120. In this case, the first tab 130 does not need to be bent. The first tab 130 extending out of the third lateral surface 113 of the second electrode assembly 120 may be directly extended to the second lateral surface 112 of the first electrode assembly 110 and electrically connected to the first electrode plate 11 located on the second lateral surface 112.

In some embodiments, the length of the first tab 130 extending out of the third lateral surface 113 of the second electrode assembly 120 is equal to the length of the first electrode assembly 110 plus a second preset length. The second preset length may be less than or equal to the first preset length.

Understandably, optionally, the length of the second tab 140 extending out of the third lateral surface 113 of the second electrode assembly 120 is equal to the length of the first electrode assembly 110 plus the second preset length.

In some embodiments, to prevent the first tab 130 and the second tab 140 from being short-circuited while extending to the second lateral surface 112 of the first electrode assembly 110, single-sided insulation tape may be affixed to inner and outer sides of the first tab 130 as well as inner and outer sides of the second tab 140. The insulation tape can also serve to fix the tab.

Figure 10:
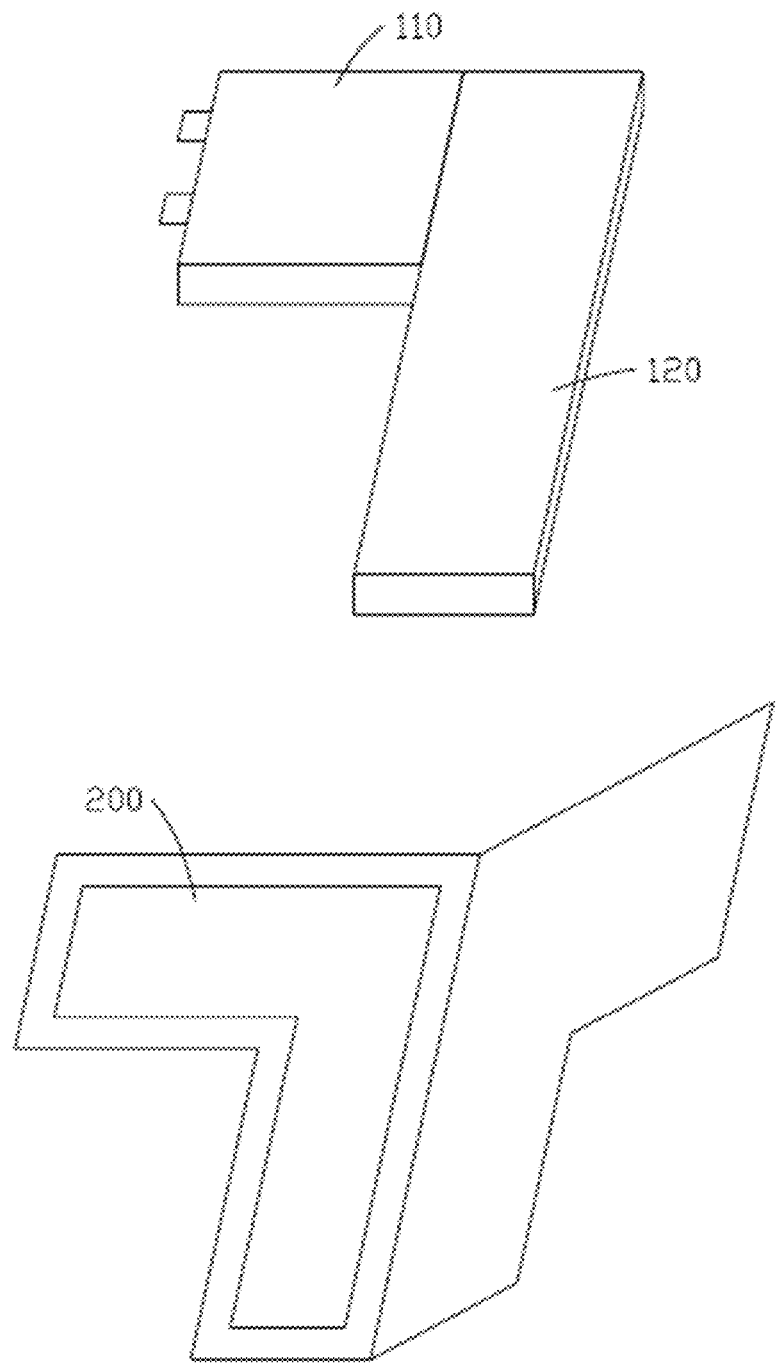
FIG. 10 is a schematic diagram of a battery cell structure to be assembled onto a housing according to an embodiment of this application.

As shown in FIG. 10, a main plane of the first electrode assembly 110 and a main plane of the second electrode assembly 120 are on an identical plane. The first electrode assembly 110 and the second electrode assembly 120 are assembled in a shared housing 200. Depths of deep pits and shallow pits of the housing 200 may be designed according to actual thicknesses of the first electrode assembly 110 and the second electrode assembly 120 to meet requirements of relative positions of the first electrode assembly 110 and the second electrode assembly 120 on the plane. A thickness of the first electrode assembly 110 may be identical to or different from a thickness of the second electrode assembly 120. In other embodiments, if the main plane of the first electrode assembly 110 and the main plane of the second electrode assembly 120 are on different planes, a shape of the housing 200 may be adjusted based on an actual assembling shape of the first electrode assembly 110 and the second electrode assembly 120.

Figure 11:
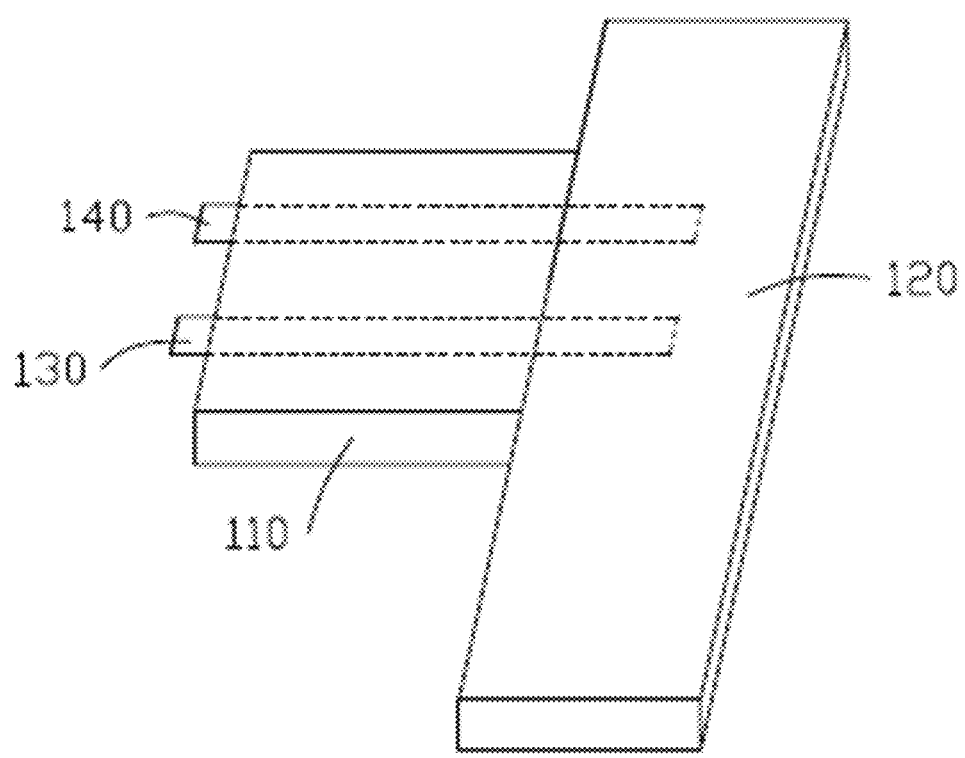
FIG. 11 is a schematic structural diagram of a battery cell structure according to another embodiment of this application.

In some embodiments, when the main plane of the second electrode assembly 120 is used as a line-of-sight plane, the first electrode assembly 110 and the second electrode assembly may form an L-shaped electrode assembly shape (as shown in FIG. 1) or a T-shaped electrode assembly shape (as shown in FIG. 11). When another plane is used as the line-of-sight plane, the first electrode assembly 110 and the second electrode assembly may form other 3-dimensional electrode assemblies.

Figure 12:
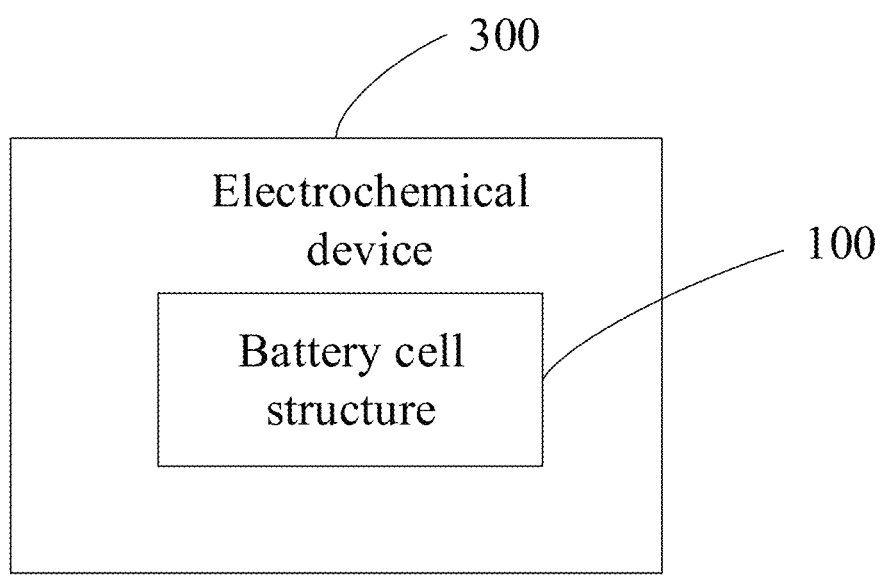
FIG. 12 is a schematic modular diagram of an electrochemical device according to an embodiment of this application.

In addition, as shown in FIG. 12, this application further discloses an electrochemical device 300. The electrochemical device 300 includes the battery cell structure 100 that falls in any of the foregoing circumstances.

Understandably, in the context of this application, a direction or a positional relationship indicated by the terms such as "center", "longitudinal", "transverse", "length", "width", "thickness", "upper", "lower", "before", "after", "left", "right", "vertical", "horizontal", "top", "bottom", "inner", "outer", "clockwise", "counterclockwise", "axial", "radial", and "circumferential" is a direction or positional relationship based on the illustration in the drawings, and is merely intended for ease or brevity of description of this application, but not intended to indicate or imply that the indicated device or component must be located in the specified direction or constructed or operated in the specified direction. Therefore, such terms are not to be understood as a limitation on this application. In the context of this application, "a plurality of" means two or more.

In the context of this specification, reference to the terms "one embodiment", "some embodiments", "exemplary embodiment", "example", "specific example", "some examples", and the like means that a particular feature, structure, material, or characteristic described in connection with the embodiment or example is included in at least one embodiment or example of this application. In this embodiment, illustrative expressions of such terms do not necessarily refer to an identical embodiment or example. In addition, the particular features, structures, materials, or characteristics may be combined in one or more embodiments in any appropriate manner.

Although the embodiments of this application are shown and described above, a person of ordinary skill in the art understands that a plurality of variations, modifications, substitutions, and derivations may be made to the embodiments without departing from the principles and conception of this application.

What is claimed is:

1. A battery cell structure, comprising:
   a first electrode assembly formed by winding a first electrode plate, a first separator, a second separator, and a second electrode plate, the first electrode assembly comprises a first lateral surface and a second lateral surface opposite to the first lateral surface, the first electrode plate includes a positive active layer, and the second electrode plate includes a negative active layer;
   a second electrode assembly formed by winding a third electrode plate, a third separator, a fourth separator, and a fourth electrode plate, the second electrode assembly comprises a third lateral surface disposed adjacent to the first lateral surface of the first electrode assembly, the third lateral surface of the second electrode assembly facing the first lateral surface of the first electrode assembly;
   an insulation layer disposed between the first lateral surface of the first electrode assembly and the third lateral surface of the second electrode assembly, and in direct contact with both the first lateral surface of the first electrode assembly and the third lateral surface of the second electrode assembly, wherein the insulation layer is in physical contact with all of the first lateral surface of the first electrode assembly and a portion that is less than all of the third lateral surface of the second electrode assembly;
   a first tab electrically connected to the third electrode plate and a second tab electrically connected to the fourth electrode plate;
   the first tab and the second tab extend out of the third lateral surface of the second electrode assembly, and extend through the first lateral surface and the second lateral surface of the first electrode assembly;
   wherein, both the first tab and the second tab extend from the second electrode assembly to the first electrode assembly through the first lateral surface of the first electrode assembly and the third lateral surface of the second electrode assembly; and
   the first tab is electrically connected to the first electrode plate located on the second lateral surface of the first electrode assembly.

2. The battery cell structure according to claim 1, wherein the second tab is electrically connected to the second electrode plate located on the second lateral surface of the first electrode assembly.

3. The battery cell structure according to claim 2, wherein the first electrode assembly comprises n winding layers, an innermost winding layer of the first electrode assembly is defined as a $1^{st}$ winding layer of the first electrode assembly, an outermost winding layer of the first electrode assembly is defined as an $n^{th}$ winding layer of the first electrode assembly, the second electrode assembly comprises m winding layers, an innermost winding layer of the second electrode assembly is defined as a $1^{st}$ winding layer of the second electrode assembly, and an outermost winding layer of the second electrode assembly is defined as an $m^{th}$ winding layer of the second electrode assembly, wherein both n and m are positive integers greater than 1.

4. The battery cell structure according to claim 3, wherein the first tab is electrically connected to the first electrode plate on the $n^{th}$ winding layer of the first electrode assembly, and the second tab is electrically connected to the second electrode plate on the $n^{th}$ winding layer of the first electrode assembly.

5. The battery cell structure according to claim 4, wherein a first insulation layer is disposed between the first tab located in the first electrode assembly and the $n^{th}$ winding layer of the first electrode assembly, and a second insulation layer is disposed between the first tab located in the first electrode assembly and the second tab located in the first electrode assembly.

6. The battery cell structure according to claim 4, wherein the first tab is electrically connected to the third electrode plate on the $1^{st}$ winding layer of the second electrode assembly, and the second tab is electrically connected to the fourth electrode plate on the $1^{st}$ winding layer of the second electrode assembly.

7. The battery cell structure according to claim 4, wherein the first tab is electrically connected to the third electrode plate on the $m^{th}$ winding layer of the second electrode assembly, and the second tab is electrically connected to the fourth electrode plate on the $m^{th}$ winding layer of the second electrode assembly.

8. The battery cell structure according to claim 4, wherein the first tab is electrically connected to the third electrode plate on an $i^{th}$ winding layer of the second electrode assembly, and the second tab is electrically connected to the fourth electrode plate on a $j^{th}$ winding layer of the second electrode assembly, wherein both i and j are positive integers greater than 1 and less than m.

9. The battery cell structure according to claim 1, wherein a length of a tab extending out of the second electrode assembly is equal to a length of the first electrode assembly plus a preset length, and the preset length is less than or equal to 10 mm.

10. The battery cell structure according to claim 1, wherein the first electrode assembly and the second electrode assembly share a housing, and, when a main plane of the second electrode assembly is used as a line-of-sight plane, the first electrode assembly and the second electrode assembly form an L-shaped electrode assembly shape or a T-shaped electrode assembly shape.

11. The battery cell structure according to claim 1, wherein the first electrode plate and the second electrode plate are wound around a first reel to form the first electrode assembly, the third electrode plate and the fourth electrode plate are wound around a second reel to form the second electrode assembly, and the first reel is parallel or perpendicular to the second reel.

12. The battery cell structure according to claim 1, wherein the first tab is formed by cutting a current collector of the third electrode plate, and the second tab is formed by cutting a current collector of the fourth electrode plate.

13. An electrochemical device, comprising a battery cell structure, and the battery cell structure comprising:
   a first electrode assembly formed by winding a first electrode plate, a first separator, a second separator, and a second electrode plate, the first electrode assembly comprises a first lateral surface and a second lateral surface opposite to the first lateral surface, the first electrode plate includes a positive active layer, and the second electrode plate includes a negative active layer;
   a second electrode assembly formed by winding a third electrode plate, a third separator, a fourth separator, and a fourth electrode plate, the second electrode assembly comprises a third lateral surface disposed adjacent to the first lateral surface of the first electrode assembly, the third lateral surface of the second electrode assembly facing the first lateral surface of the first electrode assembly;
   an insulation layer disposed between the first lateral surface of the first electrode assembly and the third lateral surface of the second electrode assembly, and in direct contact with both the first lateral surface of the first electrode assembly and the third lateral surface of the second electrode assembly, wherein the insulation layer is in physical contact with all of the first lateral surface of the first electrode assembly and a portion that is less than all of the third lateral surface of the second electrode assembly;
   a first tab electrically connected to the third electrode plate and a second tab electrically connected to the fourth electrode plate;
   the first tab and the second tab extend out of the third lateral surface of the second electrode assembly, and extend through the first lateral surface and the second lateral surface of the first electrode assembly;
   wherein, both the first tab and the second tab extend from the second electrode assembly to the first electrode assembly through the first lateral surface of the first electrode assembly and the third lateral surface of the second electrode assembly; and
   the first tab is electrically connected to the first electrode plate located on the second lateral surface of the first electrode assembly.

14. The electrochemical device according to claim 13, wherein the second tab is electrically connected to the second electrode plate located on the second lateral surface of the first electrode assembly.

15. The electrochemical device according to claim 14, wherein the first electrode assembly comprises n winding layers, an innermost winding layer of the first electrode assembly is defined as a 1st winding layer of the first electrode assembly, an outermost winding layer of the first electrode assembly is defined as an $n^{th}$ winding layer of the first electrode assembly, the second electrode assembly comprises m winding layers, an innermost winding layer of the second electrode assembly is defined as a $1^{st}$ winding layer of the second electrode assembly, and an outermost winding layer of the second electrode assembly is defined as an $m^{th}$ winding layer of the second electrode assembly, wherein both n and m are positive integers greater than 1.

* * * * *